United States Patent [19]

Sayegh

[11] Patent Number: 5,002,359

[45] Date of Patent: Mar. 26, 1991

[54] BUFFERED INSULATED OPTICAL WAVEGUIDE FIBER CABLE

[75] Inventor: Emile G. Sayegh, Austin, Tex.

[73] Assignee: W. L. Gore & Associates, Inc., Newark, Del.

[21] Appl. No.: 527,222

[22] Filed: May 22, 1990

[51] Int. Cl.⁵ .......................... G02B 6/44; S05D 5/06
[52] U.S. Cl. .................................. 350/96.23; 427/163
[58] Field of Search ............... 350/96.23, 96.30–96.34; 427/163

[56] References Cited

U.S. PATENT DOCUMENTS

| | | | |
|---|---|---|---|
| 3,785,718 | 1/1974 | Gloge | 350/96.30 |
| 3,980,390 | 9/1976 | Yamamoto et al. | 350/96.30 |
| 4,072,400 | 2/1978 | Claypoole et al. | 350/96.30 |
| 4,105,284 | 8/1978 | Olshansky | 350/96.33 |
| 4,113,350 | 9/1978 | Haines | 350/96.29 |
| 4,147,407 | 4/1979 | Eichenbaum et al. | 350/96.34 |
| 4,167,305 | 9/1979 | Ichiba et al. | 350/96.34 |
| 4,396,645 | 8/1983 | Kimura et al. | 427/163 |
| 4,514,037 | 4/1985 | Bishop et al. | 350/96.23 |
| 4,687,293 | 8/1987 | Randazzo | 350/96.23 |
| 4,765,713 | 8/1988 | Matsuo et al. | 350/96.34 |
| 4,770,490 | 9/1988 | Gruenewald et al. | 350/96.23 |
| 4,804,246 | 2/1989 | Kobayashi et al. | 350/96.34 |

OTHER PUBLICATIONS

The Bell System Technical Journal, vol. 54, No. 2, Feb. 1975, pp. 245–262, "Optical Fiber Packaging and Its Influence on Fiber Straightness and Loss", D. Gloge.

Primary Examiner—Akm Ullah
Attorney, Agent, or Firm—Gary A. Samuels

[57] ABSTRACT

A polymer-insulated glass optical waveguide fiber cable is buffered by an adhesively bound soft porous polytetrafluoroethylene taper layer to minimize stress on the glass fiber core and provide a low thermal expansion coefficient buffer and strong environmental protection.

9 Claims, 1 Drawing Sheet

BUFFERED INSULATED OPTICAL WAVEGUIDE FIBER CABLE

FIELD OF THE INVENTION

This invention relates to the field of optical waveguide fiber cables, particularly those having silica-based or glass optical fiber cores.

BACKGROUND OF THE INVENTION

Optical communication glass fibers are made from glass such as quartz glass or doped silica glass and are extremely small in diameter and hence weak in strength. Under normal conditions of use, such fibers may be subjected to considerable bending strain and other tensile forces during the cable manufacturing process and while being pulled through ducts and otherwise bent, twisted, or manipulated during reeling or during installation. In the transmission of light signals through optical fiber cables, the signals are readily attenuated in response to relatively small distortions in the cable, such as those caused by the above stresses, sharp bends or roughness in the surface of the fiber to produce light signal distortions or attenuation at an unacceptable level.

To confine the optical signals inside the signal-transmitting fiber core, a glass or silica fiber core is coated with a glass cladding or an amorphous fluoropolymer coating always of a lower refractive index from that of the optical fiber. The coating on the glass cladding may optionally be a silicone, acrylic, polyimide, or other release agent and a polymer coating, which is usually a hard or soft polymer coating which is coated on the fiber from a melt or a solution of the polymer, or extruded onto the fiber. Many hard and soft plastic coatings have been tried and some of these have been applied in layers for varying purposes as disclosed in U.S. Pat. Nos. 4,113,350, 4,105,284, 4,380,367, 4,072,400, 3,930,103, 4,463,329, 4,099,837, and 4,642,265, of which the background discussion contained therein is hereby incorporated into this application. Another excellent discussion of optical fiber packaging and buffering is provided by a paper in the *Bell System Technical Journal*, in Volume 54, No. 2, pages 245-262, February 1975, by D. Gloge.

SUMMARY OF THE INVENTION

The invention provides a buffered insulated optical waveguide fiber cable comprising a glass or amorphous fluoropolymer clad hard polymer coated glass fiber core, followed by a layer of porous polytetrafluoroethylene (PTFE) tape adhered to the hard polymer coating layers by a high-temperature adhesive coated on the inside of the porous PTFE tape. The soft porous PTFE buffering layer can be covered by jacketing, such as an inner jacket of high-temperature polymer in the form of wrapped laminated tape, a dipped coating from a solvent, or by an extruded melt. A strength member sheath can then be applied followed by an outer jacket of the same polymer materials as the inner jacket or from other materials for environmental protection.

DESCRIPTION OF THE INVENTION

Figure 1:
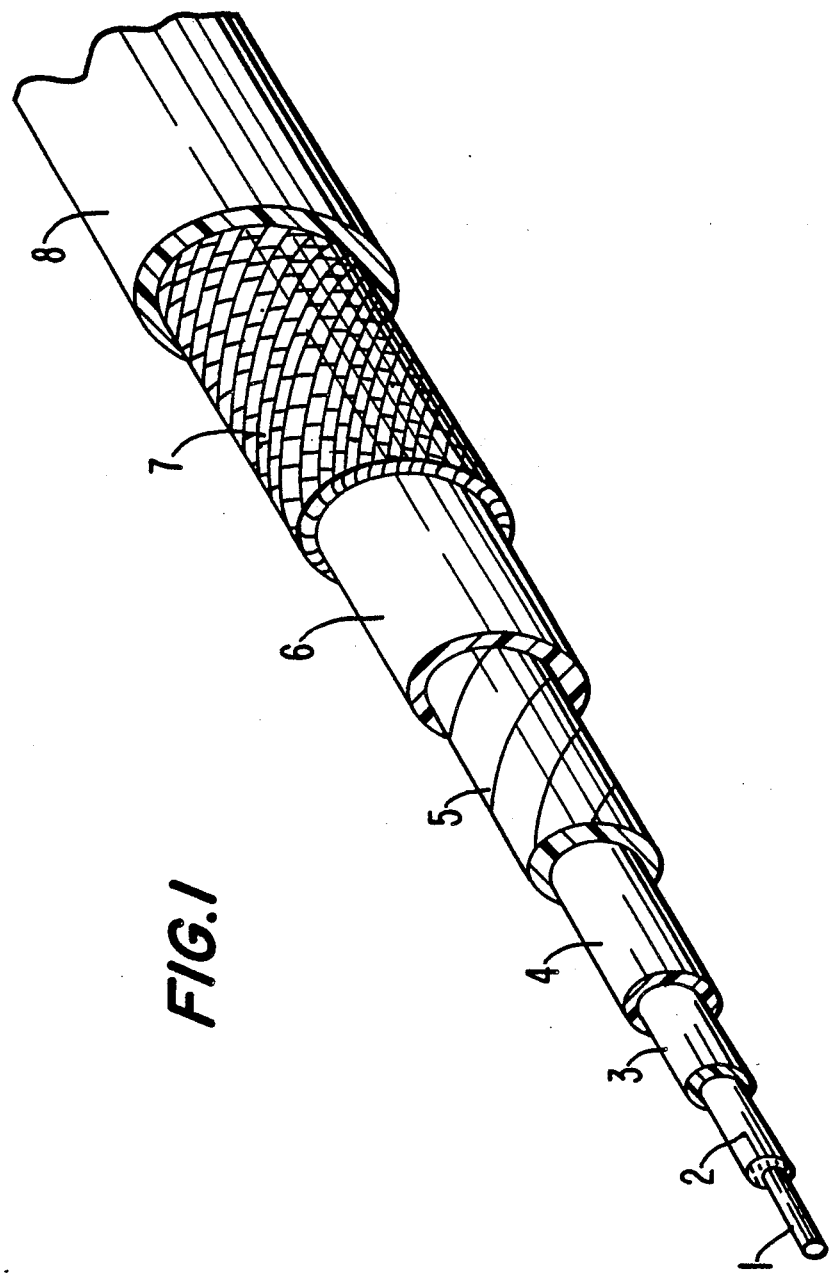
FIG. 1 shows a cross-sectional perspective view of an optical waveguide cable of the invention.

The invention is described now with reference to the FIGURE to more carefully delineate the details and materials useful in the invention.

FIG. 1 shows a buffered insulated optical waveguide fiber cable comprising a core 1 of doped silica fiber clad with a pure silica, or amorphous fluoropolymer cladding 2 and a polyimide, acrylic, polyether ether ketone or other hard polymer coating 3 on the cladding. The amorphous fluoropolymer may be a homopolymer of bis(trifluoromethyl)difluorodioxole or a copolymer with tetrafluoroethylene or other fluorinated ethylenes. Other forms of doped glass and silica may be used and a glass cladding may be used instead of silica for cladding 2. Cladding 2 always has a lower refractive index than light transmitting fiber 1. Other equally hard and protective polymer materials which usually have a higher refractive index than cladding 2 may substitute for the polyimide of layer 3. The above three layers are known in the art and comprise the starting material for the cable of the invention.

The above three-layer core is covered by a soft polymer buffering layer 5. For example, layer 5 can be helically wrapped or cigarette-wrapped with layers of porous PTFE tape which has on the inside a coating of adhesive 4 to bond it to hard polymer layer 3. Adhesive 4 is applied to layer 5 by laminating it onto layer 5 by rolling it, by deposition from solvent or by extrusion or other known methods. Adhesive 4 allows the controlled adhesion of a soft polymer buffering layer 5 to the core so that stress is not placed on the fiber during thermal cycling of the cable.

Also, when the waveguide fiber cable is used with a crimp-on connector for termination of the cable, accurate fiber optic cable termination can be made, since the insulation will adhere firmly to the fiber optic core of the cable and not slide uncontrollably on the core during the termination operation. Some crimp-on connectors use the buffer layers as a support to crimp on and then pull on the fiber longitudinally. If the glass fiber is not adhered to the buffer layers, pistoning of the fiber occurs into the buffer. Silicone rubber has been tried as a soft polymer buffer, but it has about thirty times as high a coefficient of thermal expansion as does porous PTFE and induces high optical loss owing to thermal cycling of the cable, such as the −55° to 200° C. cycle required in military specifications for such cable. Thermal expansion of a polymer adhered to a core causes stress distortion of the core resulting in excessive signal attenuation. Also, expansion of the polymer results in the cable splitting or connectors popping off.

The porous PTFE utilized in the buffering layer surrounding the glass fiber core is preferably that disclosed and described in U.S. Pat. Nos. 3,953,566, 4,187,390, 3,962,153, and 4,096,227, a porous expanded PTFE material.

Adhesive 4 coated on tape 5 may be a thermoplastic fluorinated polymer, such as fluorinated ethylene-propylene copolymer, polymers of perfluoroalkoxy tetrafluoroethylene, or polyvinyl fluoride, for example or may be a polyester or an organopolysiloxaneimide polymer (block copolymers of diorgano siloxanes and polyimide units), polyether ether ketone, or polyurethane.

The soft porous PTFE-buffered core can then be provided with a jacket. For example, first jacket 6 comprises a protective polymer material, which could be of Kapton polyimide tape, polyether ether ketone, organopolysiloxane-imide, polyester, full density PTFE tape (density about 1.8 to about 2.2), or copolymer of ethylene and polytetrafluoroethylene, for example.

A protective strength member 7 of tough polymer strands was then braided (or could be unbraided strands) around first jacket 6. The strands of braided strength member were chosen from among Kevlar® polyester, Rastex® PTFE, polyimide or Vectran® naphthalene based aromatic copolyester for example.

The cable was then enclosed in a second jacket 8 for protection against the environment. Second jacket 8 was made from polyvinyl chloride, rubber, silicone rubber, urethane rubber, or full density PTFE tape and could be applied by extrusion in the case of thermoplastic materials or by tape wrapping in the case of non-thermoplastic materials.

To protect a waveguide fiber cable from a chemical environment and/or a thermally and mechanically abusive environment, porous PTFE tape layer 5 was adhered to the optical fiber core with a fluorinated polymer adhesive, full density PTFE tape applied and sintered to give jacket 5, braided strength member 7 manufactured from Rastex PTFE fiber, and full density PTFE tape helically wound around the braided strength member and sintered to a unitary material to provide second jacket 8—an all PTFE-protected cable.

The cable of the invention has stable signal carrying characteristics under severe conditions as a result of controlled adhesion of materials of low coefficient of expansion to the core of the cable to minimize or remove stress when the cable is bent or heat cycled in use. In this invention, the expansion and contraction of the glass fiber during thermal cycling will not be affected by the contraction and expansion of the buffer. This is owing to the use of porous PTFE, which has a low thermal expansion coefficient as buffer, and which has a flexible hinge like microstructure which prevents the trapping of the fiber which would result in creation of microbends in the glass fiber. The porous PTFE buffer is forgiving enough and has low resilience so that it will conform to the most relaxed position of the glass fiber. The cable is also protected from a hostile environment by proper choice of and careful application of strong environmentally resistant materials. Controlled adhesion of a soft buffering layer also allows a cable to be mass-terminated by crimping without the common pistoning problems which occur in cables where the buffer is not adhered tightly to the fiber coating. The soft porous PTFE buffer allows excellent bonding by epoxy adhesives of the cable to a crimp connector.

I claim:

1. A buffered insulated optical waveguide fiber cable comprising in order from the inside to the outside of said cable, the layers:
   (a) a glass fiber core coated in order with a cladding and a hard polymer coating surrounding said cladding; and
   (b) a layer of porous polytetrafluoroethylene adhered to said hard polymer coating by an adhesive.

2. The cable of claim 1 which additionally contains in order a heat-resistant first polymer jacket, a polymer fiber strength member sheath, and a second polymer jacket.

3. A cable of claim 2 wherein said glass fiber core is coated with a polyimide protective cladding and a polyimide hard polymer coating, said adhesive adhering said porous polytetrafluoroethylene layer to said hard coating comprises fluorinated ethylene propylene copolymer, said first jacket comprises polytetrafluoroethylene, said strength member comprises polyester, and said second jacket comprises polytetrafluoroethylene.

4. A cable of claim 1 wherein said hard polymer coating is selected from the group of polymers comprising polyimide and polyether ether ketone.

5. A cable of claim 1 wherein said adhesive is selected from the group comprising polyether ether ketone, fluorinated ethylene propylene copolymers, polymers of perfluoroalkoxy tetrafluoroethylene, polyvinyl fluoride, polyester, polyurethane, and organopolysiloxaneimide polymer (block copolymers of diorganosiloxane and polyimide units).

6. A cable of claim 2 wherein said strength member sheath comprises braided fibers selected from the group polyester, polytetrafluoroethylene, polysulfone, and polyamide fibers.

7. A cable of claim 2 wherein said first polymer jacket is selected from the group polyimide tape, polyether ether ketone, organopolysiloxane-imide, polyester, full density polytetrafluoroethylene tape, and copolymer of ethylene and tetrafluoroethylene.

8. A cable of claim 2 wherein said second polymer jacket is selected from the group polyvinyl chloride, rubber, silicone rubber, urethane rubber, and full density polytetrafluoroethylene tape.

9. A cable of claim 2 wherein said first polymer jacket, said strength member sheath, and said second polymer jacket comprise polytetrafluoroethylene.

* * * * *